(12) United States Patent
Chen et al.

(10) Patent No.: US 8,941,609 B2
(45) Date of Patent: Jan. 27, 2015

(54) MULTI-TOUCH SENSING SYSTEM CAPABLE OF OPTIMIZING TOUCH BULBS ACCORDING TO VARIATION OF AMBIENT LIGHTING CONDITIONS AND METHOD THEREOF

(75) Inventors: Yen-Lin Chen, Taipei (TW); Chao-Wei Yu, Pingtung County (TW); Chuan-Yen Chiang, Nantou County (TW); Yang-Lang Chang, Taoyuan County (TW); Wen-Yew Liang, Taipei (TW)

(73) Assignee: National Taipei University of Technology, Taipei (TW)

( * ) Notice: Subject to any disclaimer, the term of this patent is extended or adjusted under 35 U.S.C. 154(b) by 236 days.

(21) Appl. No.: 13/560,353

(22) Filed: Jul. 27, 2012

(65) Prior Publication Data
US 2013/0187867 A1    Jul. 25, 2013

(30) Foreign Application Priority Data
Jan. 20, 2012   (TW) ............................. 101102614 A

(51) Int. Cl.
*G09G 5/00*   (2006.01)
*G06F 3/033*   (2013.01)
*G06F 3/041*   (2006.01)

(52) U.S. Cl.
USPC ............................. 345/173; 345/156; 345/166

(58) Field of Classification Search
USPC ................................................ 345/173, 175
See application file for complete search history.

(56) References Cited

U.S. PATENT DOCUMENTS

| 7,598,949 B2 * | 10/2009 | Han | 345/204 |
| 7,705,835 B2 * | 4/2010 | Eikman | 345/176 |
| 2003/0137494 A1 * | 7/2003 | Tulbert | 345/173 |
| 2008/0029691 A1 * | 2/2008 | Han | 250/224 |
| 2009/0128499 A1 * | 5/2009 | Izadi et al. | 345/173 |
| 2011/0018824 A1 * | 1/2011 | Kang et al. | 345/173 |
| 2011/0050650 A1 * | 3/2011 | McGibney et al. | 345/175 |
| 2012/0038590 A1 * | 2/2012 | Kim et al. | 345/175 |

FOREIGN PATENT DOCUMENTS

| TW | M398155 U1 | 2/2011 |
| TW | M399375 U1 | 3/2011 |

OTHER PUBLICATIONS

Chen, Ten-Lin, et al. "Vision-Based Finger Detection, Tracking, and Event Identification Techniques for Multi-Touch Sensing and Display Systems" Sensors. vol. 11:7, pp. 6868-6892, Jul. 1, 2011. Taiwan.

* cited by examiner

*Primary Examiner* — Temesgh Ghebretinsae
*Assistant Examiner* — Benyam Ketema
(74) *Attorney, Agent, or Firm* — Saliwanchik, Lloyd & Eisenschenk

(57) ABSTRACT

The present invention discloses a multi-touch sensing system capable of optimizing touch bulbs according to the variation of ambient lighting conditions and a method thereof. The system comprises an image capturing module, a computing module and a processing module. The image capturing module captures a touch image. The computing module converts the touch image into a histogram and selects a grayscale threshold to segment the histogram by dichotomy for generating a segmented image of touch bulbs, and then calculates a between-class variance and a total pixel variance of the segmented image to estimate the separability factor thereof. The processing module determines whether or not the separability factor conforms to a predetermined value; if yes, then the processing module performs an image binarization of the touch image to generate a binary image, or else the processing module repeats the aforementioned process until the separability factor conforms to a predetermined value.

14 Claims, 6 Drawing Sheets

MULTI-TOUCH SENSING SYSTEM CAPABLE OF OPTIMIZING TOUCH BULBS ACCORDING TO VARIATION OF AMBIENT LIGHTING CONDITIONS AND METHOD THEREOF

CROSS-REFERENCE TO RELATED APPLICATION

This application claims the benefit under 35 U.S.C. of Taiwan Patent Application No. 101102614, filed Jan. 20, 2012, which is hereby incorporated by reference in its entirety.

FIELD OF THE INVENTION

The present invention relates to a multi-touch sensing system, in particular to the multi-touch sensing system capable of optimizing touch bulbs according to a variation of ambient lighting conditions and a method thereof.

BACKGROUND

In recent years, new 3C products integrated with a touch panel are launched constantly to meet market requirements, and manufacturers introduce various types of 3C products integrated with the touch panel are introduced to the market continuously due to the severe market competition. Among these products, a multi-touch sensing system uses a camera to capture a light spot produced by the touch of a user's moving fingers on the touch panel, and execute a corresponding the operation instruction according to the motion trajectory of the light spot. However, the conventional touch systems still have many drawbacks.

R.O.C. Pat. No. M399375 discloses a display touch system that uses a photo sensor and a camera to detect a touch point of a user's finger and calculates a change of displacement and speed of the user's finger. However, if the number of touch points increases, then the number of required photo sensors must also increase to improve the recognition rate, thus increasing the cost and reducing the flexibility of using the system.

R.O.C. Pat. No. M398155 discloses an optical touch system that uses a laser sensing module and one or more sensing units to detect a photo interrupt point on a sensing area to determine the position of a touch point. However, if many fingers are moved in the detecting area at the same time, a detection error of the sensing unit may occur easily due to the masking between fingers.

U.S. Pat. No. 7,598,949 discloses a multi-touch LED display device that uses a plurality of emission type LEDs and sensing type LEDs to create a sensing area to sense coordinates of a finger that touches the sensing area, and requires two or more cameras to capture information of the touch interface. However, when the ambient light of the LED varies, wrong determinations may result, and if the number of touch points increases, the camera may be unable to capture the information or may cause errors due to the masking between the touch points.

Therefore, it is a subject for the present invention to provide a multi-touch sensing system capable of detecting a touch bulb produced by a plurality of fingers moving in a detection area without requiring additional components, while maintaining excellent stability and applicability in different illumination conditions or in a condition of being affected by infrared noises.

BRIEF SUMMARY

In view of the shortcomings of the prior art, it is a primary objective of the present invention to provide a multi-touch sensing system capable of optimizing touch bulbs according to the variation of ambient lighting conditions and a method thereof to overcome the problems of the prior art.

To achieve the aforementioned objective, the present invention provides a multi-touch sensing system capable of optimizing touch bulbs according to the variation of ambient lighting conditions. The system comprises an image capturing module, a computing module and a processing module. The image capturing module captures a touch image by a touch panel of the multi-touch sensing system. The computing module receives the touch image and converts the touch image into a histogram, and selects a grayscale threshold to segment the histogram by dichotomy to generate a segmented image, and then calculates a between-class variance and a total pixel variance of a pixel class of the segmented image to estimate a separability factor (SF) of the pixel class of the segmented image. The processing module determines whether the separability factor conforms to a predetermined value; if yes, then use the grayscale threshold to execute an image binarization on the touch image to produce a binary image, and output an operation instruction according to a motion trajectory of each touch bulb in the binary image, or else control the computing module to select the grayscale threshold again, and repeat the aforementioned steps until the separability factor conforms to the predetermined value.

To achieve the aforementioned objective, the present invention further provides a method of a multi-touch sensing system capable of optimizing touch bulbs according to the variation of ambient lighting conditions. The method comprises the steps of: using an image capturing module to capturea touch image from a touch panel of the multi-touch sensing system; receiving the touch image through a computing module, converting the touch image into a histogram, selecting a grayscale threshold to segment the histogram by dichotomy to produce a segmented image, and calculating a between-class variance and a total pixel variance of a pixel class of the segmented image to estimate a separability factor of the pixel class of the segmented image; and using a processing module to determine whether the separability factor conforms to a predetermined value; if yes, then using the grayscale threshold to execute an image binarization on the touch image to produce an binary image, and outputting an operation instruction according to a motion trajectory of each touch bulb in the binary image, or else controlling the computing module to select the grayscale threshold again, and repeating the aforementioned steps until the separability factor conforms to the predetermined value.

Preferably, the separability factor SF may satisfy the following relations:

$$SF = V_{BC}(T)/V_T = 1 - V_{WC}(T)/V_T$$

and $0 \le SF \le 1$ wherein, $V_{BC}$ is the between-class variance of the segmented image, $V_T$ is the total pixel variance of the segmented image, $V_{WC}$ is a within-class variance of the segmented image, and T is a set of multi-grayscale threshold.

Preferably, the predetermined value is a value apporaching to 1, so that all pixel classes of the segmented image can be seperated more clearly.

Preferably, the computing module calculates a within-class variance of the pixel class of the segmented image, and selects the threshold again according to a pixel class with the largest within-class variance contribution value in the segmented image.

Preferably, the multi-touch sensing system may further comprise a tracking module coupled to the processing module and provided for tracking each of the touch bulbs to calculate the motion trajectory of each of the touch bulbs.

Preferably, the tracking module may calculate a position and a motion direction of each of the touch bulbs at each time point according to the center point of each of the touch bulbs to obtain the motion trajectory of each of the touch bulbs.

Preferably, the operation instruction may include a moving, rotating, pressing, hovering, or clicking instruction.

In summation, the multi-touch sensing system and method capable of optimizing touch bulbs according to the variation of ambient lighting conditions of the present invention have one or more of the following advantages:

(1) The multi-touch sensing system and method capable of optimizing touch bulbs according to the variation of ambient lighting conditions of the present invention uses an automatic multi-threshold fast light spot segmentation technique to maintain excellent stability and applicability when the multi-touch sensing system is affected by infrared noises or situated in different illumination conditions.

(2) The multi-touch sensing system and method capable of optimizing touch bulbs according to the variation of ambient lighting conditions of the present invention can automatically find the best grayscale threshold to segment the touch image, so as to identify the touch bulb in the touch image more accurately.

(3) The multi-touch sensing system and method capable of optimizing touch bulbs according to the variation of ambient lighting conditions of the present invention can identify each touch bulb accurately without requiring additional sensing module or camera, even if the number of touch bulbs of the touch image increases. Therefore, the invention can lower the system cost and improve the flexibility of use.

(4) The multi-touch sensing system and method capable of optimizing touch bulbs according to the variation of ambient lighting conditions of the present invention can calculate the position and motion direction of each touch bulb at each time point according to the center point of each touch bulb more accurately.

(5) The multi-touch sensing system and method capable of optimizing touch bulbs according to the variation of ambient lighting conditions of the present invention uses a simple iterative method to identify each touch bulb accurately. Therefore, the invention can reduce the computational complexity of the system significantly.

DETAILED DESCRIPTION

Figure 1:
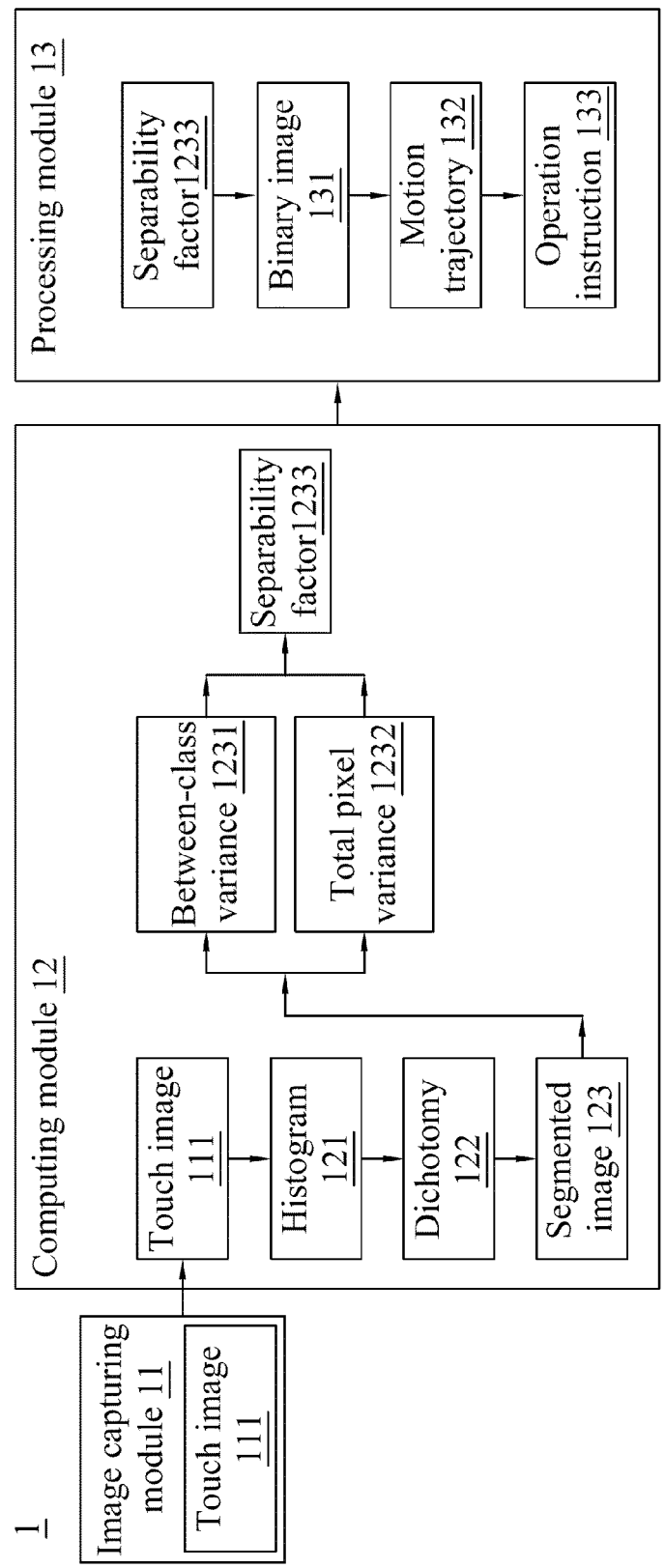
FIG. 1 is a block diagram of a multi-touch sensing system capable of optimizing touch bulbs according to a variation of ambient lighting conditions in accordance with a first preferred embodiment of the present invention.

The technical characteristics of the present invention will become apparent with the detailed description of the preferred embodiments accompanied with the illustration of related drawings as follows. It is noteworthy to point out that same numerals are used for representing the same respective elements in the drawings.

In a frustrated total internal reflection (FTIR) system proposed by Jeff Han in 2006, an acrylic board made of a special material is used as a touch panel, and a red LED light source is projected at edges of the acrylic board, such that a total reflection can be achieved at an inner side of the acrylic board. When a finger touches the acrylic board, an infrared light inside the acrylic board will change its reflective angle due to the media, and the infrared light is reflected into a CCD to form a light spot, and then the light spot is processed to analyze the light spot. The FTIR system has advantages by using the acrylic board as the touch panels, and supports large touch hardware with a lower cost, and the FTIR system is very suitable for family use. The present invention makes improvements based on the FTIR system, such that significant touch characteristics can be selected accurately and effectively to identify the motion trajectory of a touch point accurately under various ambient lighting conditions.

With reference to FIG. 1 for a block diagram of a multi-touch sensing system capable of optimizing touch bulbs according to a variation of ambient lighting conditions in accordance with the first preferred embodiment of the present invention, the multi-touch sensing system 1 comprises an image capturing module 11, a computing module 12 and a processing module 13. The image capturing module 11 captures a touch image 111 of the touch panel of the multi-touch sensing system 1. The computing module 12 receives the touch image 111, and converts the touch image 111 into a histogram 121, and selects a grayscale threshold to segment histogram 121 by dichotomy 122 to generate a segmented image 123. And then, the computing module 12 calculates a between-class variance 1231 and a total pixel variance 1232 of the segmented image 123 to estimate a separability factor (SF) 1233 of a pixel class of the segmented image 123. The processing module 13 determines whether the separability factor 1233 conforms to a predetermined value for to perform further process. Wherein, the separability factor is determined by the ratio of the between-class variance to the total pixel variance and conforms to the following relations:

$$SF = V_{BC}(T)/V_T = 1 - V_{WC}(T)/V_T$$

and $0 \leq SF \leq 1$ wherein, $V_{BC}$ is the between-class variance of the segmented image, $V_T$ is the total pixel variance of the segmented image, $V_{WC}$ is a within-class variance of the segmented image, and T is a set of multi-grayscale threshold.

In the total grayscale pixel variance $V_T$ in the aforementioned relation is used as a regular parameter, so that the value of the SF falls within a range of 0≤SF≤1. If the value of the SF approaches its minimum value 0, it means that the grayscale values of all pixels in the image are concentrated at a uniform value. On the other hand, if the value of the SF approaches its maximum value 1, it means that all pixel classes are separated clearly. Therefore, the maximum value of the SF can be set as a predetermined value to design a threshold selection and an image segmentation method.

Therefore, if the predetermined value approaches the value 1 such as 0.9, and the separability factor 1233 is greater than or equal to 0.9, then the processing module 13 will determine that the threshold can separate each pixel class in the touch image 111 effectively, and the processing module 13 will be able to use the threshold to execute an image binarization on the touch image 111 to produce an binary image 131. If the separability factor 1233 is smaller than 0.9, then the processing module 13 will determine that the threshold cannot separate each pixel class in the touch image 111 effectively. Now, the processing module 13 controls the computing module 12 to select the threshold again, and repeat the aforemented steps until the separability factor 1233 to conform to the predetermined value 0.9.

Finally, the processing module 13 can output an operation instruction 133 such as a moving, rotating pressing, hovering or clicking instruction according to the motion trajectory 132 of each touch bulb in the binary image 131 and determine the corresponding event according to the characteristics of the trajectory.

It is noteworthy to point out that the present invention can use the aforementioned automatic multi-threshold fast light spot segmentaion technique to process the image, so that even if the multi-touch sensing system being affected by infrared noises or situated in various different illumination conditions, excellent stability and applicability can still be maintained, and the touch bulb in the touch image can be identified quicky and effectively. In addition, the present invention can be applied in a frustrated total internal reflection (FTIR) system to identify the touch bulbs in the touch image accurately without requiring additional sensing module or camera. Therefore, the present invention can reduce the cost and enhance the flexibility of using the system.

Figure 2:
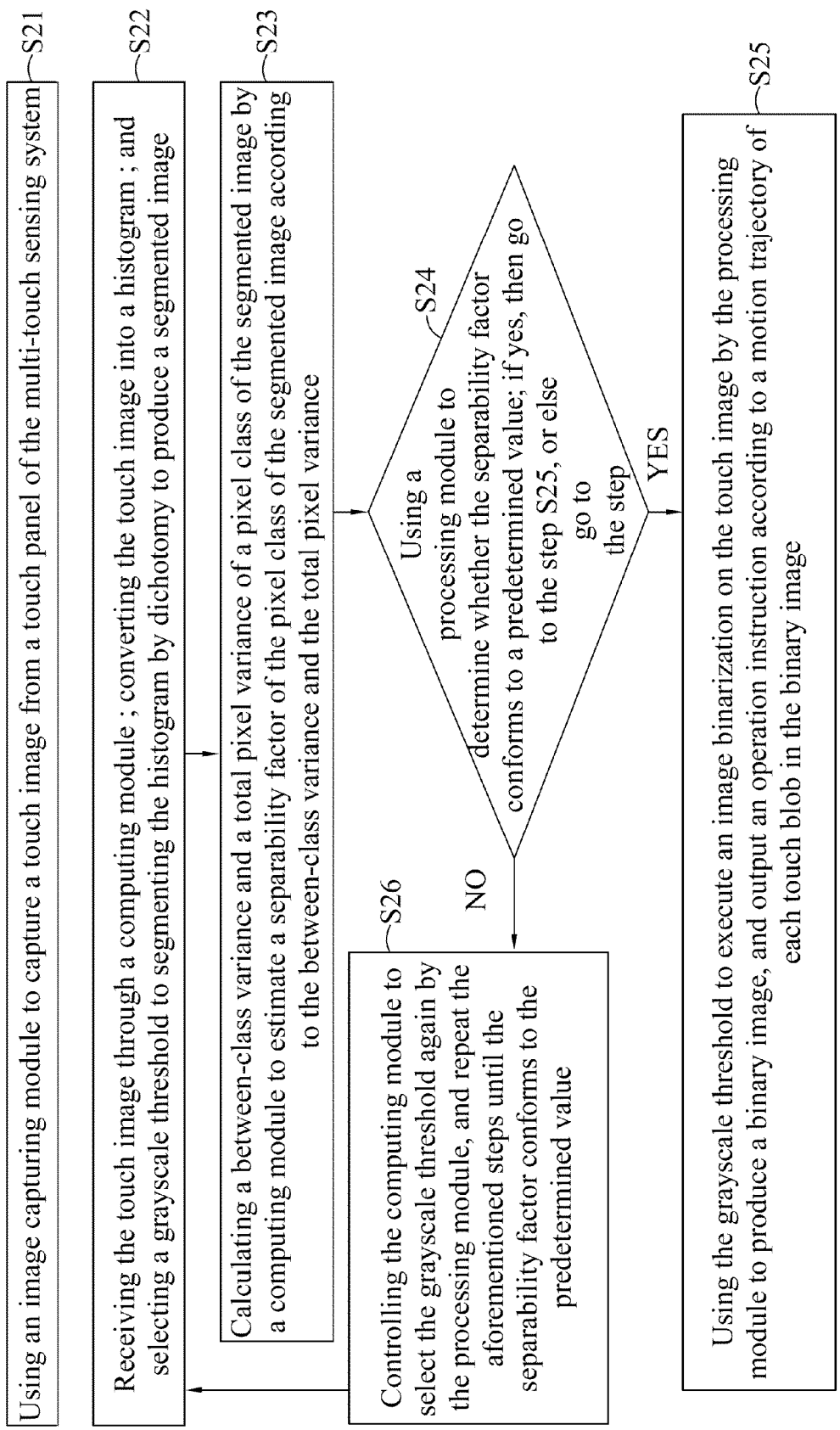
FIG. 2 is a flow chart of a multi-touch sensing method capable of optimizing touch bulbs according to a variation of ambient lighting conditions in accordance with the first preferred embodiment of the present invention.

With reference to FIG. 2 for a flow chart of a multi-touch sensing method capable of optimizing touch bulbs according to a variation of ambient lighting conditions in accordance with the first preferred embodiment of the present invention, the method comprises the following steps:

S21: Using an image capturing module to capture a touch image from a touch panel of the multi-touch sensing system.

S22: Receiving the touch image through a computing module; converting the touch image into a histogram; and selecting a grayscale threshold to segmenting the histogram by dichotomy to produce a segmented image.

S23: Calculating a between-class variance and a total pixel variance of a pixel class of the segmented image by a computing module to estimate a separability factor of the pixel class of the segmented image according to the between-class variance and the total pixel variance.

S24: Using a processing module to determine whether the separability factor conforms to a predetermined value; if yes, then go to the step S25, or else go to the step S26.

S25: Using the grayscale threshold to execute an image binarization on the touch image by the processing module to produce a binary image, and output an operation instruction according to a motion trajectory of each touch bulb in the binary image.

S26: Controlling the computing module to select the grayscale threshold again by the processing module, and repeat the aforementioned steps until the separability factor conforms to the predetermined value.

Figure 3:
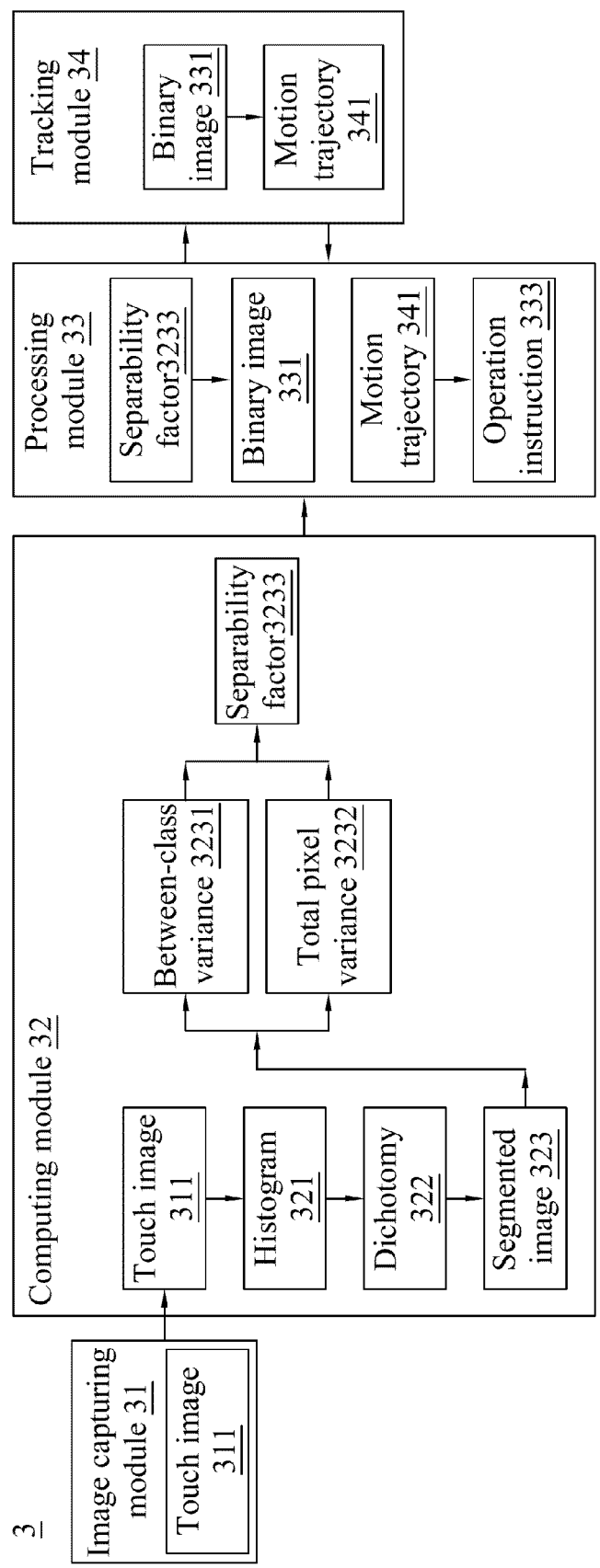
FIG. 3 is a block diagram of a multi-touch sensing system capable of optimizing touch bulbs according to a variation of ambient lighting conditions in accordance with a second preferred embodiment of the present invention.

With reference to FIG. 3 for a block diagram of a multi-touch sensing system capable of optimizing touch bulbs according to a variation of ambient lighting conditions in accordance with the second preferred embodiment of the present invention, the multi-touch sensing system 3 comprises an image capturing module 31, a computing module 32, a processing module 33 and a tracking module 34. Same as above, the image capturing module 31 captures a touch image 311. The computing module 32 receives the touch image 311 and converts the touch image 311 into a histogram 321, and selects a grayscale threshold, and segment the histogram 321 by dichotomy 322 to generate a segmented image 323. The computing module 32 calculates a between-class variance 3231 and a total pixel variance 3232 of the segmented image 323 to estimate a separability factor (SF) 3233 of a pixel class of the segmented image 323. The processing module 33 determines whether the separability factor 3233 conforms to the predetermined value 0.9 for further processing.

If the separability factor 3233 is greater than or equal to the predetermined value 0.9, the processing module 33 will use the threshold to execute an image binarization on the touch image 311 to produce a binary image 331. Now, the tracking module 34 will trace each touch bulb in the binary image 331, and calculate a position and a motion direction of each touch bulb at each time point according to the center point of each touch bulb to obtain a motion trajectory 341 of each touch bulb. The processing module outputs an operation instruction 333 according to the motion trajectory 341, so that the multi-touch sensing system 3 will execute a user's instruction according to the operation instruction 333.

If the separability factor 3233 is smaller than the predetermined value 0.9, the computing module 32 will calculate a within-class variance of a pixel class of the segmented image 323 and select a threshold again according to a pixel class of the maximum within-class variance contribution value in the segmented image 323, and the aforementionhed steps will be repeated until the separability factor 1233 conforms to the predetermined value 0.9.

It is noteworthy to point out that the aforementioned method of identifying the separability factor (SF) can be used to segment a bulb sequentially into homogenous objects of the touch image obtained by the recursive method, until all of the homogenous objects in the touch image are segmented. In addition, the quantity of objects and the ambient light conditions are not concerns. To minimize the number of times of the recursive segmentations to maximize the separability factor (SF) such as a value approaching to 1.0, it is necessary to keep the within-class variance of the segmented pixel class to a minimum. To acheive this objective, the segmentation algorithm requires to select a pixel class of the largest within-class variance contribution value to perform the binary segmentation in each recursive computation, so that the maximum value can be obtained in the smallest number of times of recursive segmentations, so as to substantially reduce the computing resource required by the system.

On the other hand, the present invention further uses a tracking module to track each touch bulb in the binary image, and calculate a position and a motion direction of each touch bulb at each time point according to the center point of each touch bulb, so as to estimate the motion trajectory of each touch bulb more accurately.

Finally, the processing module 33 can output the operation instruction 333 according to the motion trajectory 332 of each touch bulb in the binary image 331.

Figure 4:
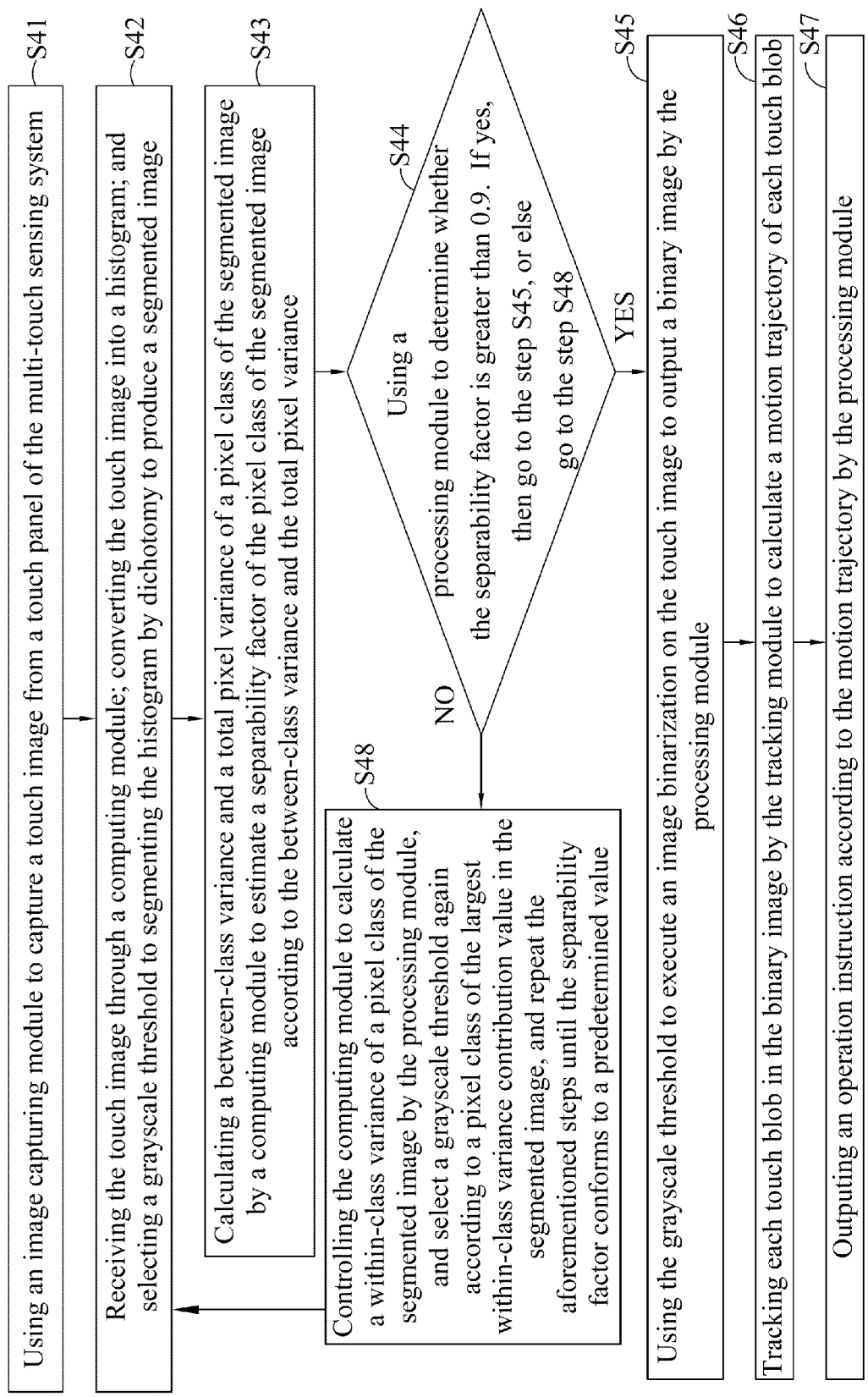
FIG. 4 is a flow chart of a multi-touch sensing method capable of optimizing touch bulbs according to a variation of ambient lighting conditions in accordance with the second preferred embodiment of the present invention.

With reference to FIG. 4 for a flow chart of a multi-touch sensing method capable of optimizing touch bulbs according to a variation of ambient lighting conditions in accordance with the second preferred embodiment of the present invention, the method comprises the following steps:

S41: Using an image capturing module to capture a touch image from a touch panel of the multi-touch sensing system.

S42: Receiving the touch image through a computing module; converting the touch image into a histogram; and selecting a grayscale threshold to segmenting the histogram by dichotomy to produce a segmented image.

S43: Calculating a between-class variance and a total pixel variance of a pixel class of the segmented image by a computing module to estimate a separability factor of the pixel class of the segmented image according to the between-class variance and the total pixel variance.

S44: Using a processing module to determine whether the separability factor is greater than 0.9. If yes, then go to the step S45, or else go to the step S48.

S45: Using the grayscale threshold to execute an image binarization on the touch image to output a binary image by the processing module.

S46: Tracking each touch bulb in the binary image by the tracking module to calculate a motion trajectory of each touch bulb.

S47: Outputting an operation instruction according to the motion trajectory by the processing module.

S48: Controlling the computing module to calculate a within-class variance of a pixel class of the segmented image by the processing module, and select a grayscale threshold again according to a pixel class of the largest within-class variance contribution value in the segmented image, and repeat the aforementioned steps until the separability factor conforms to a predetermined value.

Figure 5:
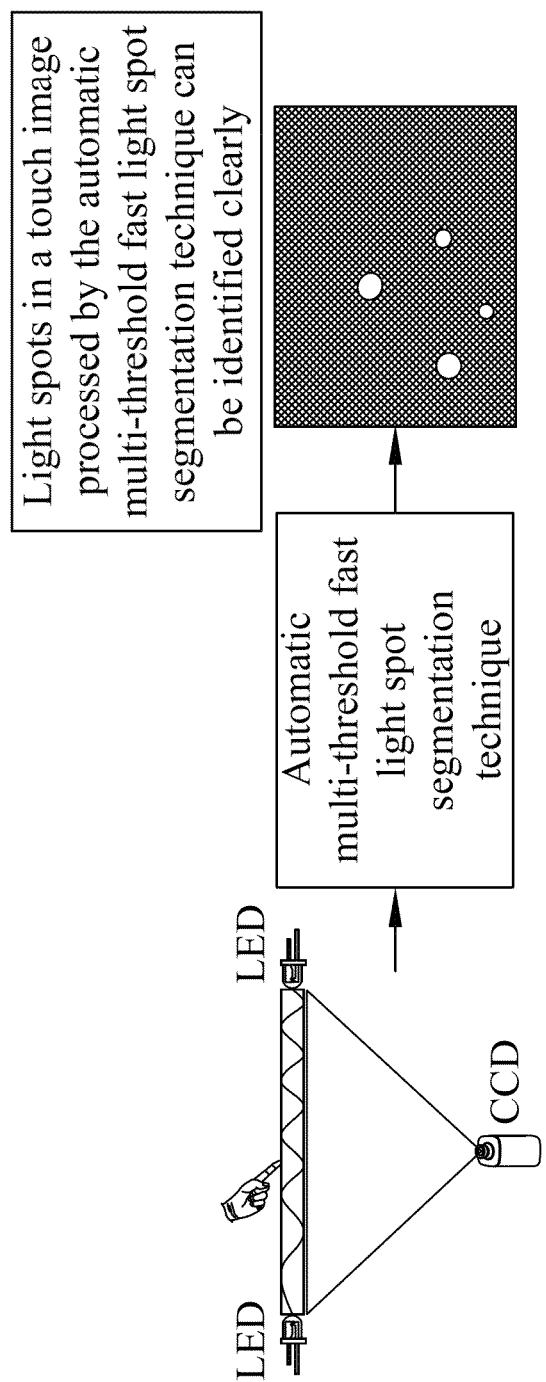
FIG. 5 is a schematic view of a multi-touch sensing system capable of optimizing touch bulbs according to a variation of ambient lighting conditions in accordance with a preferred embodiment of the present invention.

With reference to FIG. 5 for a schematic view of a multi-touch sensing system capable of optimizing touch bulbs according to a variation of ambient lighting conditions in accordance with a preferred embodiment of the present invention, the technical measures taken by the present invention are the same as above, and can be applied in a frustrated total internal reflection (FTIR) system as shown in the figure. When users execute the multi-touch function by the frustrated total internal reflection (FTIR) system, the camera captures a touch image of a touch panel and the automatic multi-threshold fast light spot segmentaion technique of the present invention can be used to obtain a clear touch image.

Although the concept of the touch method of the multi-touch sensing system capable of optimizing touch bulbs according to the variation of ambient lighting conditions of the present invention has been described in the section of the multi-touch sensing system capable of optimizing touch bulbs according to the variation of ambient lighting conditions of the present invention, the following flow chart is given to illustrate the invention clearly.

Figure 6:
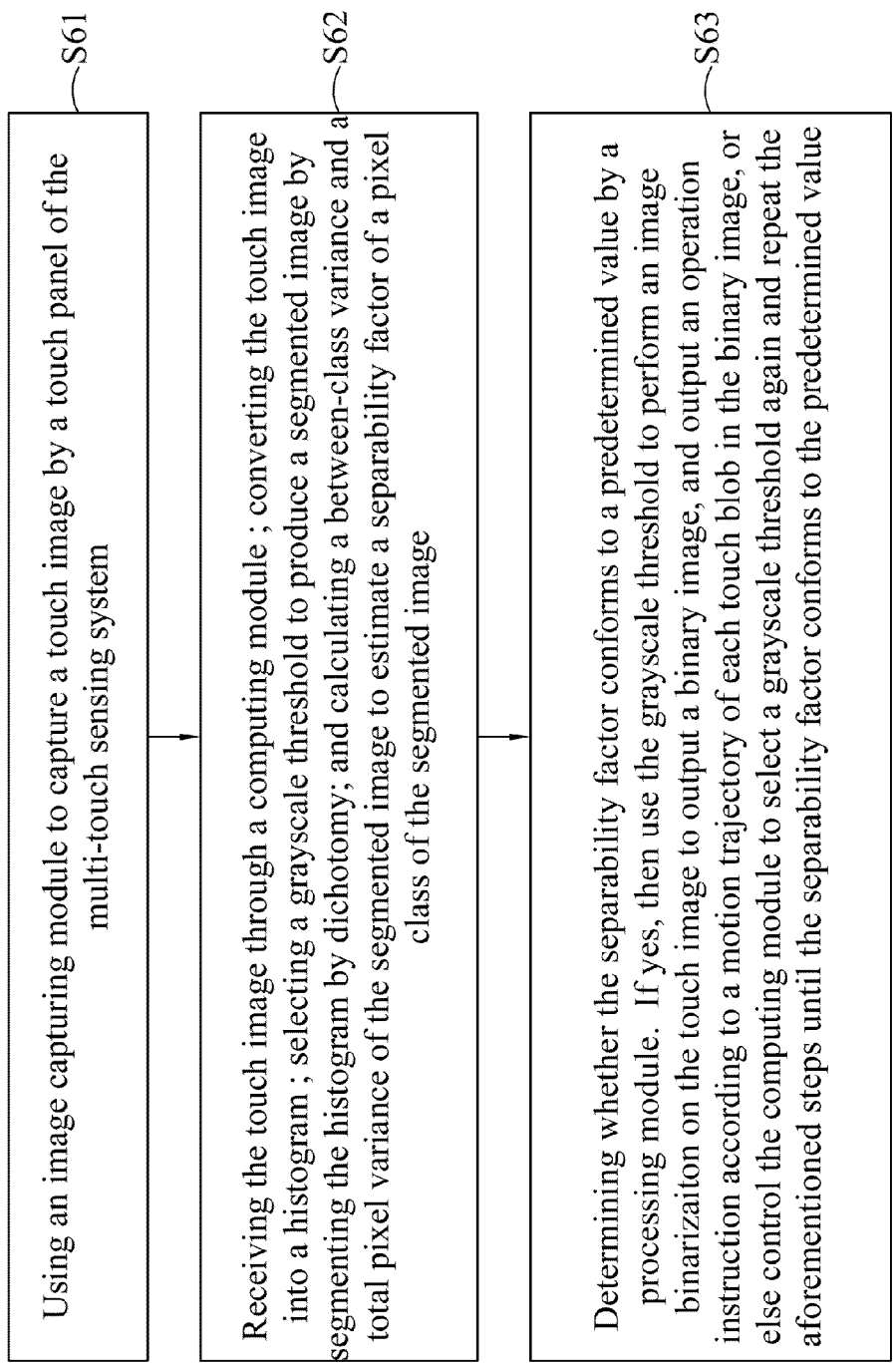
FIG. 6 is a flow chart of a touch light spot method of a multi-touch sensing system capable of optimizing touch bulbs according to a variation of ambient lighting conditions in accordance with a preferred embodiment of the present invention.

With reference to FIG. 6 for a flow chart of a touch method of a multi-touch sensing system capable of optimizing touch bulbs according to a variation of ambient lighting conditions in accordance with the present invention, the method comprises the following steps:

S61: Using an image capturing module to capture a touch image by a touch panel of the multi-touch sensing system.

S62: Receiving the touch image through a computing module; converting the touch image into a histogram; selecting a grayscale threshold to produce a segmented image by segmenting the histogram by dichotomy; and calculating a between-class variance and a total pixel variance of the segmented image to estimate a separability factor of a pixel class of the segmented image.

S63: Determining whether the separability factor conforms to a predetermined value by a processing module. If yes, then use the grayscale threshold to perform an image binarizaiton on the touch image to output a binary image, and output an operation instruction according to a motion trajectory of each touch bulb in the binary image, or else control the computing module to select a grayscale threshold again and repeat the aforementioned steps until the separability factor conforms to the predetermined value.

The details and implenetnation method of the method of the present invention has been described in the section of the multi-touch sensing system capable of optimizing touch bulbs according to the variation of ambient lighting conditions of the present invention, and thus will not be repeated.

In summation, the multi-touch sensing system and mehtod capable of optimizing touch bulbs according to the variation of ambient lighting conditions in accordance with the present invention use a novel image segmentation technique to maintain excellent stability and applicability in the condition of the multi-touch sensing system being affected by infrared noises or situated in various different illumination conditions, and reduce the computational complexity of the system significantly. In addition, the present invention can automatically find the best grayscale threshold to segment the touch image in order to identify the touch bulb in the touch image effectively. In addition, even if the number of touch bulbs increases, the present invention does not require additional sensing modules or cameras to identify each touch bulb accurately. Therefore, the invention can lower the cost and improve the flexibility of use significantly. The present invention further uses the tracking module to calculate the position and motion direction of each touch bulb at each time point according to the center point of each touch bulb, so that the motion trajectory of each touch bulb can be identified more accurately.

In summation of the description above, the present invention breaks through the prior, achieves the expected effects, and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A multi-touch sensing system capable of optimizing touch bulbs according to a variation of ambient lighting conditions, comprising:

an image capturing module, provided for capturing a touch image from a touch panel of the multi-touch sensing system;

a computing module, provided for receiving the touch image, converting the touch image into a histogram, selecting a grayscale threshold to segment the histogram by dichotomy to produce a segmented image, and calculating a between-class variance and a total pixel variance of a pixel class of the segmented image to estimate a separability factor of the pixel class of the segmented image; and a processing module, provided for determining whether the separability factor conforms to a predetermined value; if yes, then using the grayscale threshold to execute an image binarization on the touch image to produce a binary image, and outputting an operation instruction according to a motion trajectory of each touch bulb in the binary image, or else controlling the computing module to select the grayscale threshold again, and repeating the aforementioned steps until the separability factor conforms to the predetermined value;

wherein the separability factor SF satisfies relations of: $SF = V_{BC}(T)/V_T = 1 - V_{WC}(T)/V_T$ and $0 \le SF \le 1$, wherein $V_{BC}$ is the between-class variance of the segmented image, $V_T$ is the total pixel variance of the segmented image, $V_{WC}$ is a within-class variance of the segmented image, and T is a set of multi-grayscale thresholds.

2. The multi-touch sensing system capable of optimizing touch bulbs according to a variation of ambient lighting conditions as recited in claim 1, further comprising a tracking module coupled to the processing module and provided for tracking each of the touch bulbs to calculate the motion trajectory of each of the touch bulbs.

3. The multi-touch sensing system capable of optimizing touch bulbs according to a variation of ambient lighting conditions as recited in claim 1, wherein the predetermined value is a value approaching to 1, so that all pixel classes of the segmented image can be separated more clearly.

4. The multi-touch sensing system capable of optimizing touch bulbs according to a variation of ambient lighting conditions as recited in claim 1, wherein the computing module calculates a within-class variance of the pixel class of the segmented image, and selects the grayscale threshold again according to the pixel class with the largest within-class variance contribution value in the segmented image.

5. The multi-touch sensing system capable of optimizing touch bulbs according to a variation of ambient lighting conditions as recited in claim 1, further comprising a tracking module coupled to the processing module and provided for tracking each of the touch bulbs to calculate the motion trajectory of each of the touch bulbs.

6. The multi-touch sensing system capable of optimizing touch bulbs according to a variation of ambient lighting conditions as recited in claim 5, wherein the tracking module calculates a position and a motion direction of each of the touch bulbs at each time point according to a center point of each of the touch bulbs to obtain the motion trajectory of each of the touch bulbs.

7. The multi-touch sensing system capable of optimizing touch bulbs according to a variation of ambient lighting conditions as recited in claim 6, wherein the operation instruction includes a moving, rotating, pressing, hovering, or clicking instruction.

8. A method of automatically optimizing touch bulbs of a multi-touch sensing system according to a variation of ambient lighting conditions, comprising the steps of:

using an image capturing module to capture a touch image from a touch panel of the multi-touch sensing system;

receiving the touch image through a computing module, converting the touch image into a histogram, selecting a grayscale threshold to segmenting the histogram by dichotomy to produce a segmented image, and calculating a between-class variance and a total pixel variance of a pixel class of the segmented image to estimate a separability factor of the pixel class of the segmented image; and using a processing module to determine whether the separability factor conforms to a predetermined value; if yes, then using the grayscale threshold to execute an image binarization on the touch image to produce a binary image, and outputting an operation instruction according to a motion trajectory of each of the touch bulbs in the binary image, or else controlling the computing module to select the grayscale threshold again, and repeating the aforementioned steps until the separability factor conforms to the predetermined value;

wherein the separability factor SF satisfies relations of: $SF = V_{BC}(T)/V_T = 1 - V_{WC}(T)/V_T$ and $0 \le SF \le 1$, wherein $V_{BC}$ is the between-class variance of the segmented image, $V_T$ is the total pixel variance of the segmented image, $V_{WC}$ is a within-class variance of the segmented image, and T is a set of multi-grayscale thresholds.

9. The method of automatically optimizing touch bulbs of a multi-touch sensing system according to a variation of ambient lighting conditions as recited in claim 8, further comprising the step of using a tracking module to track each of the touch bulbs to calculate the motion trajectory of each of the touch bulbs.

10. The method of automatically optimizing touch bulbs of a multi-touch sensing system according to a variation of ambient lighting conditions as recited in claim 8, wherein the predetermined value is a value approaching to 1, so that all the pixel classes of the segmented image can be separated more clearly.

11. The method of automatically optimizing touch bulbs of a multi-touch sensing system according to a variation of ambient lighting conditions as recited in claim 8, further comprising the step of using the computing module to calculate a within-class variance of the pixel class of the segmented image, and select the grayscale threshold again according to the pixel class with the largest within-class variance contribution value in the segmented image.

12. The method of automatically optimizing touch bulbs of a multi-touch sensing system according to a variation of ambient lighting conditions as recited in claim 8, further comprising the step of using a tracking module to track each of the touch bulbs to calculate the motion trajectory of each of the touch bulbs.

13. The method of automatically optimizing touch bulbs of a multi-touch sensing system according to a variation of ambient lighting conditions as recited in claim 12, further comprising the step of using the tracking module to calculates a position and a motion direction of each of the touch bulbs at each time point according to a center point of each of the touch bulbs to obtain the motion trajectory of each of the touch bulbs.

14. The method of automatically optimizing touch bulbs of a multi-touch sensing system according to a variation of ambient lighting conditions as recited in claim 13, wherein the operation instruction includes a moving, rotating, pressing, hovering or clicking instruction.

\* \* \* \* \*